(12) United States Patent
Hadder (10) Patent No.: US 7,043,921 B2
(45) Date of Patent: May 16, 2006

(54) TUBE COOLED COMBUSTOR

(75) Inventor: James L. Hadder, Scottsdale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 32 days.

(21) Appl. No.: 10/648,937

(22) Filed: Aug. 26, 2003

(65) Prior Publication Data

US 2005/0056020 A1    Mar. 17, 2005

(51) Int. Cl.
*F02C 1/00* (2006.01)

(52) U.S. Cl. .............................. 60/772; 60/752; 431/242

(58) Field of Classification Search .......... 60/752–760, 60/772; 431/242, 243, 182, 351
See application file for complete search history.

(56) References Cited

U.S. PATENT DOCUMENTS

| 25,086 | A | * | 8/1859 | Lotz ........................... 211/199 |
| 2,196,889 | A | * | 4/1940 | Bailey .................... 122/235.14 |
| 2,446,059 | A | * | 7/1948 | Peterson et al. ............. 432/223 |
| 2,636,345 | A | * | 4/1953 | Zoller ........................ 60/39.55 |
| 2,797,081 | A | * | 6/1957 | Sullivan et al. ............. 266/157 |
| 3,016,703 | A | * | 1/1962 | Morris et al. ................. 60/752 |
| 3,064,425 | A | * | 11/1962 | Hayes .......................... 60/756 |
| 3,129,698 | A | * | 4/1964 | Davis .......................... 122/510 |
| 3,349,558 | A | * | 10/1967 | Smith ........................... 60/754 |
| 3,572,031 | A | * | 3/1971 | Szetela ......................... 60/757 |
| 3,745,766 | A | * | 7/1973 | Melconian ................. 60/39.23 |
| 4,099,488 | A | * | 7/1978 | Damon ........................ 122/156 |
| 4,255,122 | A | * | 3/1981 | Alpkvist et al. ............. 431/215 |
| 4,288,980 | A | * | 9/1981 | Ernst ......................... 60/39.23 |
| 4,297,842 | A | * | 11/1981 | Gerhold et al. ................ 60/776 |
| 4,302,940 | A | * | 12/1981 | Meginnis ....................... 60/754 |
| 4,357,907 | A | * | 11/1982 | Campbell et al. ........... 122/4 D |
| 4,436,530 | A | * | 3/1984 | Child et al. ............... 48/197 R |
| 4,449,510 | A | * | 5/1984 | Sukup ....................... 126/99 A |
| 4,458,481 | A | * | 7/1984 | Ernst ........................ 60/39.511 |
| 4,473,014 | A | * | 9/1984 | Dejanovich .................. 110/264 |
| 4,474,014 | A | * | 10/1984 | Markowski ................... 60/738 |
| 4,550,562 | A | * | 11/1985 | Rice ............................. 60/772 |
| 4,550,690 | A | * | 11/1985 | Baugher ..................... 122/510 |
| 4,579,102 | A | * | 4/1986 | Sukup ....................... 126/99 A |
| 4,607,487 | A |   | 8/1986 | Tilston |
| 4,896,510 | A | * | 1/1990 | Foltz ............................ 60/757 |
| 4,899,538 | A | * | 2/1990 | Shekleton ................ 60/39.465 |

(Continued)

*Primary Examiner*—William H. Rodriguez
(74) *Attorney, Agent, or Firm*—Ingrassia Fisher & Lorenz (57) ABSTRACT

An innovative cooling tube assembly is disclosed for use in cooling the liner of a combustor in a gas turbine engine. Each cooling tube has a serpentine shape that conforms to the contour of the liner as the tube extends from one end of the combustor to the other to conduct cooling air in a counterflow direction to the exhaust gases. The cooling air gains heat, thereby cooling the liner wall, and is delivered in the proximity of the burners where its heat aids in combustion. An assembly of cooling tubes is provided for mounting on either the cool side or the hot side of the combustor liner, the assembly comprising a plurality of nested cooling tubes. The cooling tubes may be fabricated of a metallic material and either brazed to the liner or supported by pins inserted through the liner. The cooling tubes may also be fabricated of a CMC material by an innovative method in which an expendable mandrel of the desired cooling tube shape is inserted into one or more sleeves of a woven tubular fabric bound to a fabric shell formed in the shape of the combustor liner and densified in a furnace.

16 Claims, 7 Drawing Sheets

U.S. PATENT DOCUMENTS

| | | | |
|---|---|---|---|
| 4,943,230 A * | 7/1990 | Shekleton | 431/183 |
| 4,972,786 A * | 11/1990 | Blasiole | 110/246 |
| 5,477,613 A * | 12/1995 | Bales et al. | 29/890.01 |
| 5,544,624 A * | 8/1996 | Xiong | 122/4 D |
| 5,724,816 A | 3/1998 | Ritter et al. | |
| 5,737,922 A * | 4/1998 | Schoenman et al. | 60/752 |
| 5,758,504 A * | 6/1998 | Abreu et al. | 60/754 |
| 5,799,491 A * | 9/1998 | Bell et al. | 60/752 |
| 6,134,877 A * | 10/2000 | Alkabie | 60/800 |
| 6,182,451 B1 * | 2/2001 | Hadder | 60/732 |
| 6,209,325 B1 * | 4/2001 | Alkabie | 60/737 |
| 6,341,485 B1 * | 1/2002 | Liebe | 60/772 |
| 6,428,740 B1 | 8/2002 | Dunyak et al. | |
| 6,568,188 B1 * | 5/2003 | Kolman et al. | 60/760 |
| 6,606,861 B1 * | 8/2003 | Snyder | 60/752 |
| 6,672,070 B1 * | 1/2004 | Bland et al. | 60/772 |
| 6,681,578 B1 * | 1/2004 | Bunker | 60/772 |
| 6,810,673 B1 * | 11/2004 | Snyder | 60/752 |
| 6,837,050 B1 * | 1/2005 | Mandai et al. | 60/725 |
| 2001/0015059 A1 * | 8/2001 | Fetescu et al. | 60/39.02 |
| 2002/0088233 A1 * | 7/2002 | Ohnishi et al. | 60/725 |
| 2002/0152755 A1 * | 10/2002 | Johnson et al. | 60/772 |

* cited by examiner

TUBE COOLED COMBUSTOR

BACKGROUND OF THE INVENTION

The present invention relates to the field of gas turbine engines and, in particular, to devices and methods directed towards cooling the walls, shells, and liners of combustion chambers used in gas turbine engines.

Gas turbine engines must operate at high operating temperatures to maintain an acceptable efficiency. As the operating temperature of the engine is increased, the efficiency of the engine improves. However, as operating temperatures increase, the operational lifetime of the engine components decreases because of increased thermal stress. A component of particular interest is the combustion chamber, or combustor, of the engine. One way to increase the durability of the combustor is to use an extremely thick shell or liner, but this increases weight, which is undesirable, particularly in aircraft. A more common way is to use some form of wall cooling. It is well known in the art to use cooling tubes along the surface of the combustor walls in order to reduce the wall temperature and to increase the lifetime of the chamber. The cooling tube directs cooling air along the surface of the combustor wall to cool the wall either by conduction of excess heat away from the wall, by keeping hot combustion gasses from directly contacting the wall, or by both. Such devices may also direct the cooling air counter to the direction of flow of combustion gases out of the chamber.

The use of cooling tubes for cooling combustors is well known to the art. For example, U.S. Pat. No. 4,288,980 discloses a plurality of circumferentially spaced cooling tubes for use on the interior of the combustor. The cooling tubes extend from one end of the combustor to the other in a linear manner. U.S. Pat. No. 4,607,487 discloses a combustor in which the combustion wall has a plurality of generally cylindrical passages built into the combustor wall itself, where the passages feature a way of causing vortices therein to disrupt laminar flow of the cooling air through the passages. These passages also are described as being linear. U.S. Pat. No. 5,724,816 discloses a cooling structure for a combustor with a plurality cooling channels extending axially and in some cases circumferentially to create cross flow passages between the axial channels. Again, the channels are shown as being linear.

Figure 1:
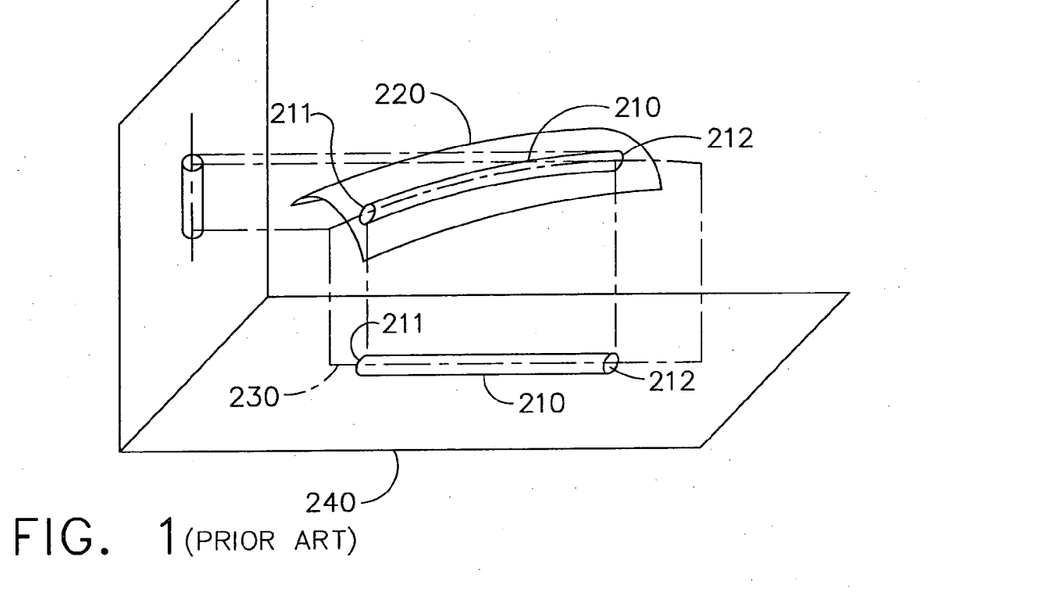
FIG. 1 shows a three dimensional view of a prior art cooling tube on the surface of a combustor liner section with projections in two planes showing the linear character of the cooling tube.

As an example, a prior art cooling tube 210, as shown in FIG. 1, is configured on a curved surface 220 that is curved in all three dimensions. Regardless of the orientation of the prior art cooling tube 210 on the curved surface 220, the centerline 230 of the prior art cooling tube 210 can always be projected onto a plane 240 such that the centerline 230 and the endpoints 211, 212 of the prior art cooling tube 210 all lie in a straight line in the plane 240. When the curved surface 220 is a liner of a combustor, one end 211 of the prior art cooling tube 210 terminates at one end of the combustor and the opposing end 212 of the prior art cooling tube 210 terminates at the other end of the combustor. A cooling gas, normally pressurized air, flowing through the prior art cooling tube 210 absorbs heat from the walls of the combustor. The prior art cooling tube 210 also absorbs heat. Depending upon the coefficient of expansion of the material from which the prior art cooling tube 210 is made, it may expand or contract in response to the steep temperature gradient, resulting in stress placed upon the cooling tube itself or at its attachment points.

The contact of the cooling tube with the cooling air running through the tube and with the hot combustion gasses surrounding the tube results in severe thermal stress to the cooling tube. This, in turn, produces elastic expansion and contraction of the cooling tube as it is subjected to high temperature gradients. If the tube is rigidly attached to the combustor wall, it may deform or crack from such stresses, resulting in a decreased time between maintenance actions. One solution known to the art is to construct the cooling tubes and chamber walls from ceramic materials that have a low coefficient of expansion. But even with the lower thermal expansion these materials exhibit brittleness and lower thermal conductivity and are therefore still susceptible to stresses generated by the thermal expansion differences between the tubes and the chamber.

It can thus be seen that there is a need for a cooling tube for a combustor in a gas turbine engine that has improved properties of resistance to thermal expansion and contraction and to vibration.

SUMMARY OF THE INVENTION

In one aspect of the present invention, a cooling tube provided for cooling a liner of a combustor chamber of a gas turbine engine comprises a first end in fluid communication with a plenum supplying cooling air to the combustor chamber and a second end in fluid communication with an area in proximity with a gas injector of the gas turbine engine. The cooling tube may have an innovative serpentine shape, where it may extend in a curved or wavy path, instead of a linear path, while maintaining contact with the liner and conforming to its contour. The serpentine shape of the cooling tube has been found to allow the cooling tube to expand and contract in response to temperature gradients in the combustor chamber without stressing the cooling tube to the point of failure.

In another aspect of the present invention, a cooling tube assembly is provided for reducing the temperature of the walls of a combustor in a gas turbine engine and comprises a plurality of serpentine cooling tubes conforming to the contour of the combustor wall, each tube extending from the plenum supplying air to the interior of the combustor, along the walls of the combustor chamber, to the proximity of the fuel injectors at the opposing end of the chamber where the exiting air assists in the combustion of the fuel. The cooling tubes comprising the assembly may have a non-uniform cross sectional aspect that may vary according to the angle of curvature of the cooling tube, so that the cooling tubes may be nested with one another.

In yet another aspect of the present invention, a method is provided for fabricating cooling tubes from a ceramic matrix composite (CMC) fabric. The method may include the fabrication of an expendable mandrel for each cooling tube in the cooling tube assembly. A CMC fabric may be woven into an expandable tubular configuration so that the expendable mandrel may be inserted therein. The mandrels prepared in this manner may be assembled on a die of the shape of a combustor liner, covered with additional fabric, and densified in a furnace.

In still another aspect of the present invention, a method is provided for attaching a cooling tube assembly composed of serpentine cooling tubes, each fabricated from a metallic material, to the hot side of a combustor liner, where the method may include brazing pins along the cooling tube wall that is nearest the liner wall at selected spaced points, inserting the pins therethrough, and fixedly attaching washers to pins on the cool side of the liner to secure the cooling tubes from removal from the holes but allowing the pins to freely rotate within the holes as the cooling tubes expand and contract in response to thermal stress.

These and other features, aspects and advantages of the present invention will become better understood with reference to the following drawings, description, and claims.

DETAILED DESCRIPTION OF THE INVENTION

The following detailed description shows the best currently contemplated modes of carrying out the invention. The description is not to be taken in a limiting sense, but is made merely for the purpose of illustrating the general principles of the invention, since the scope of the invention is best defined by the appended claims.

Figure 2:
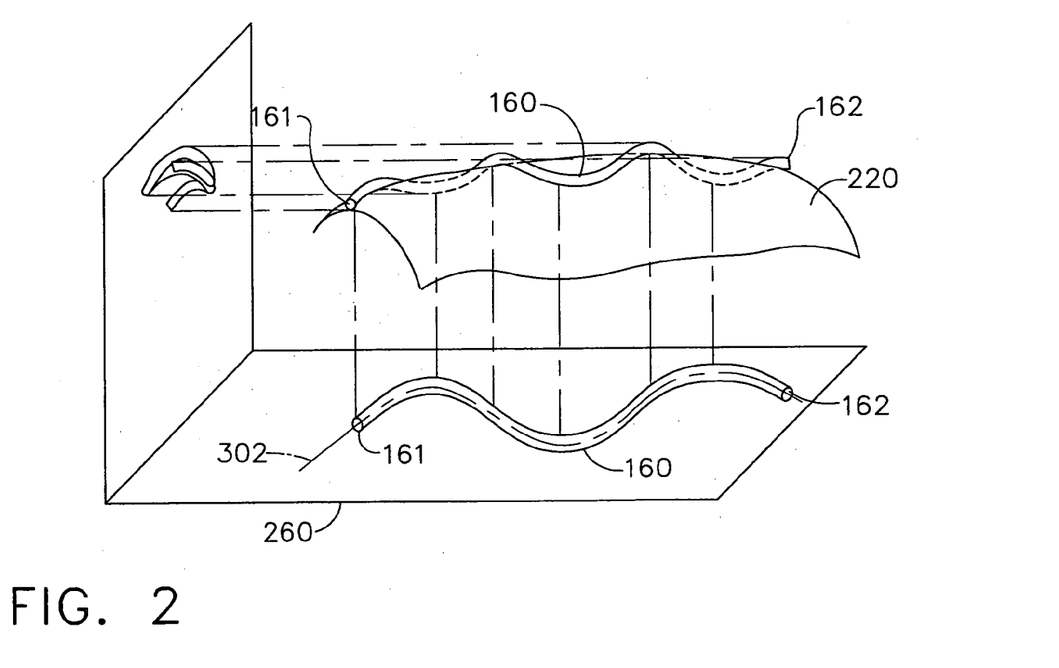
FIG. 2 shows a three dimensional view of a serpentine cooling tube on the surface of a combustor liner section with projections in two planes showing the non-linear character of the cooling tube, according to an embodiment of the invention.

Broadly, the invention provides an innovative cooling tube for reducing the temperature of an object, such as the liner of a combustor in a gas turbine engine. The cooling tube of the present invention departs from the aforementioned configuration of the prior art exemplified in FIG.1. The cooling tube 160 provided by the current invention is shown in FIG. 2 on the same curved surface 220 and projected onto plane 260. Cooling tube 160 has the characteristic that no plane exists where the first end 161, second end 162, and the centerline 302 of cooling tube 160 project onto a straight line in the plane. In general, the present invention provides a plurality of bends in the cooling tube 160 along its extent between its two ends 161, 162, such that the centerline 302 of the cooling tube 160 is not in a plane. In this case, the centerline 302, the first end 161, and the second end 162 of cooling tube 160 are non-linear when they are projected onto the plane. The cooling tube 160 can follow a curved, or serpentine, path along the surface 220 from one end to the other. If the surface 220 is a combustor liner, then the cooling tube 160 is exposed to steep temperature gradients between itself and the surface 220 to which it is attached, and the bends in the cooling tube 160 can allow it to compensate for the expansion and contraction that may result from such thermal stress.

The present invention also provides a cooling tube assembly comprised of a plurality of serpentine cooling tubes each conforming to the contour of the combustor liner. Each tube may extend from the end of the combustor from which hot exhaust gases exit, along the liner of the combustor chamber, and to an area proximate of the fuel injectors at the opposing end of the chamber. Pressurized air may be diverted from the entering air stream and routed to the exit end of the chamber, where it may be introduced to the cooling tubes in a counterflow direction to the exhaust gas stream exiting the chamber. As the air traverses the cooling tube, it may absorb heat to decrease the temperature of the combustor walls. The heated air may exit the cooling tubes in the proximity of the fuel injectors where it can aid in combustion. As the cooling tubes are heated, they can expand; the inventive serpentine shape of the tubes can allow them to elastically adjust for the expansion without damaging stresses or deformation. The ability of the cooling tube to absorb thermal stress may be enhanced by surface roughing techniques such as adding dents or bulges. The cooling tube assembly may be supported by the combustor liner on either the interior or the exterior of the combustor.

The present invention further provides a method of fabricating the serpentine cooling tube assembly. The cooling tubes comprising the cooling tube assembly may be formed as an assembly of extruded, die formed tubes and a sheet metal formed liner, or as a ceramic matrix composite (CMC) material. If additional stress relief capability or internal heat transfer enhancement is desired, then the tubes may be fabricated with dents or bulges, respectively. In the case of CMC material, fabric containing the ceramic composite may be formed over a shaped mandrel composed of an expendable material that may be removed later by heat vaporization, oxidation, or chemical means. To fabricate dents to provide stress relief, grooves may be formed in the mandrel and, after the woven fabric has been formed over the mandrel, toes of fiber may be attached around the circumference of the mandrel and over the woven fabric, thus forcing the woven fabric into the grooves. When the woven fabric is densified, the toes of fiber are absorbed, but the resulting cooling tube may exhibit dents on the surface of the tube where the woven fabric was forced into the mandrel grooves by the toes of fiber. The dents thus formed in the CMC cooling tube may provide for additional stress relief.

To fabricate internal bulges within the CMC cooling tube for internal heat transfer enhancement, the grooves in the mandrel may be filled with toes of fiber before forming the woven fabric over the outer surface of the mandrel. When the woven fabric is densified, the toes of fiber within the cooling tube are also densified, thus forming internal ridges within the cooling tube without forming indentations on the outer surface of the cooling tube. Note that in both cases, the grooves in the mandrel may be formed as discrete rings around the circumference of the mandrel or as a continuous grooves spiraling around the circumference of the mandrel along its length.

Figure 3:
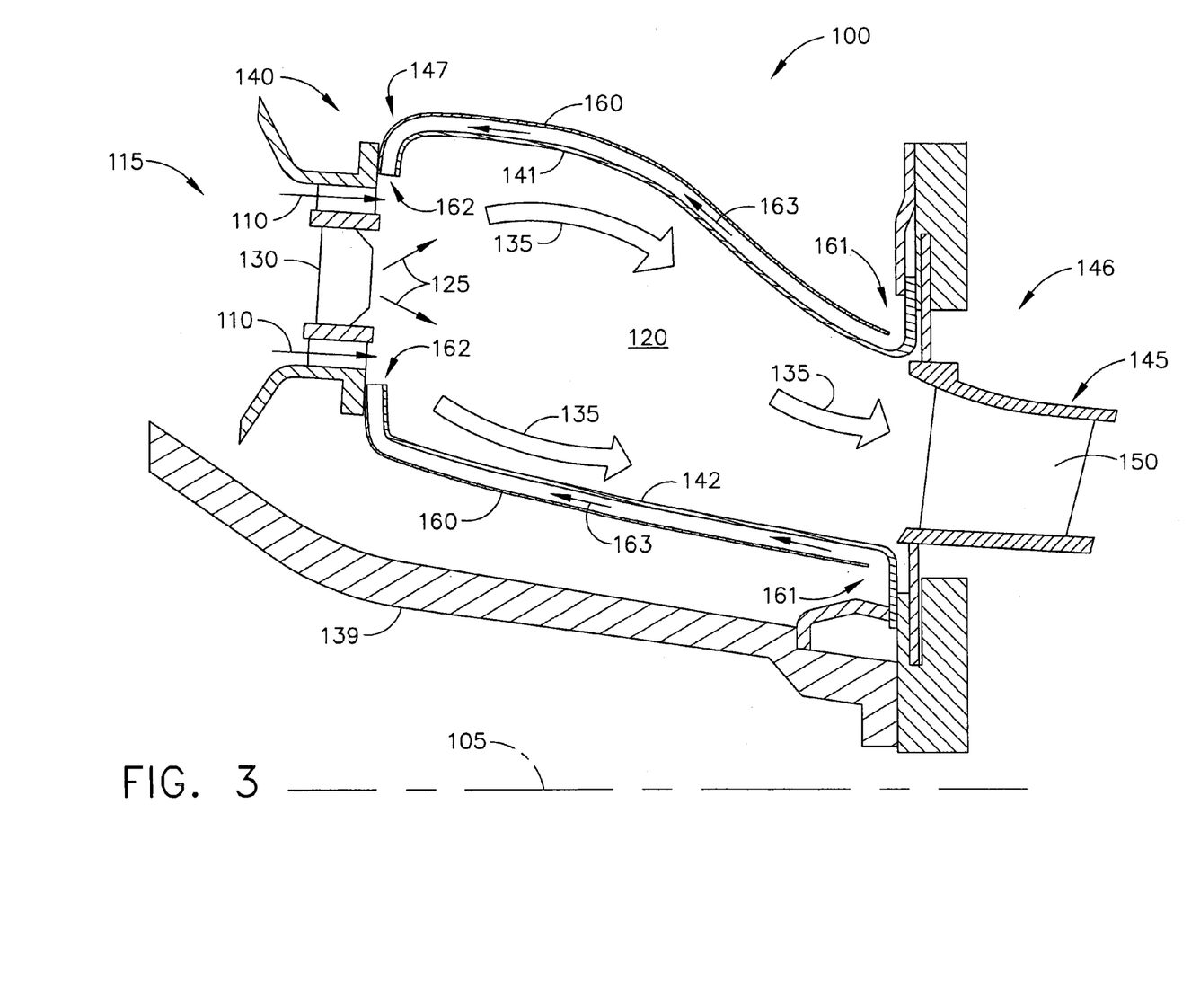
FIG. 3 shows a cross sectional view of a combustor for a gas turbine engine with cooling tubes configured on the exterior side of the shell, according to an embodiment of the invention.

Directing attention now to FIG. 3, a cross section of an embodiment of a combustor 100 typically found in a gas turbine engine is shown. The combustor 100 may be defined by a liner 140 supported by a supporting structure 139. An engine centerline 105 is shown to depict the cross section of the combustor liner 140 as it is rotated about the centerline 105 in three dimensions, much like a torus, and only the upper portion of the combustor 100 is presented. The liner 140 may be further composed of an outer liner 141 and an inner liner 142. A pressurized air stream 110 may be presented to an air intake 115 of the combustor 100 where it can enter an interior chamber 120 of the combustor 100. As the pressurized air stream 110 enters the combustor 100, it may encounter an atomized fuel stream 125 emanating from a fuel atomizer 130, where it ignites under the proper pressure and temperature conditions to form a hot gas stream 135 that may flow along the liner 140 of the chamber 120 and out an exhaust 145 of the combustor 100, where it can be applied to a vane 150 for propulsion purposes.

Cooling tubes 160 are shown on the exterior surfaces of the outer liner 141 and the inner liner 142. In the embodiment shown in FIG. 3, the cooling tubes 160 are said to be positioned on the "cool side" of the combustor chamber 120. A portion of the pressurized air stream 110 may be diverted from intake 115 along the exterior surface of the liner 140 to a plenum (not shown) located proximate to a rear end 146 of combustor 100 that is in fluid communication with a first end 161 of each cooling tube 160. Pressurized air 115 in the plenum may be forced into a first end 161 of each cooling tube 160 where it flows towards a front end 147 of the combustor 100 counter to the flow of a hot gas stream 135. This flow 163 of pressurized air is also said to be in a counterflow direction and is indicated by the arrows 163. The pressurized air 163 can increase in temperature as it gains thermal energy from the liner 140 by conduction, thus cooling the liner 140. This heated air can exit the second end 162 of cooling tube 160 in the vicinity of the atomized fuel stream 125 where it can aid in the combustion of the atomized fuel stream 125.

Figure 4:
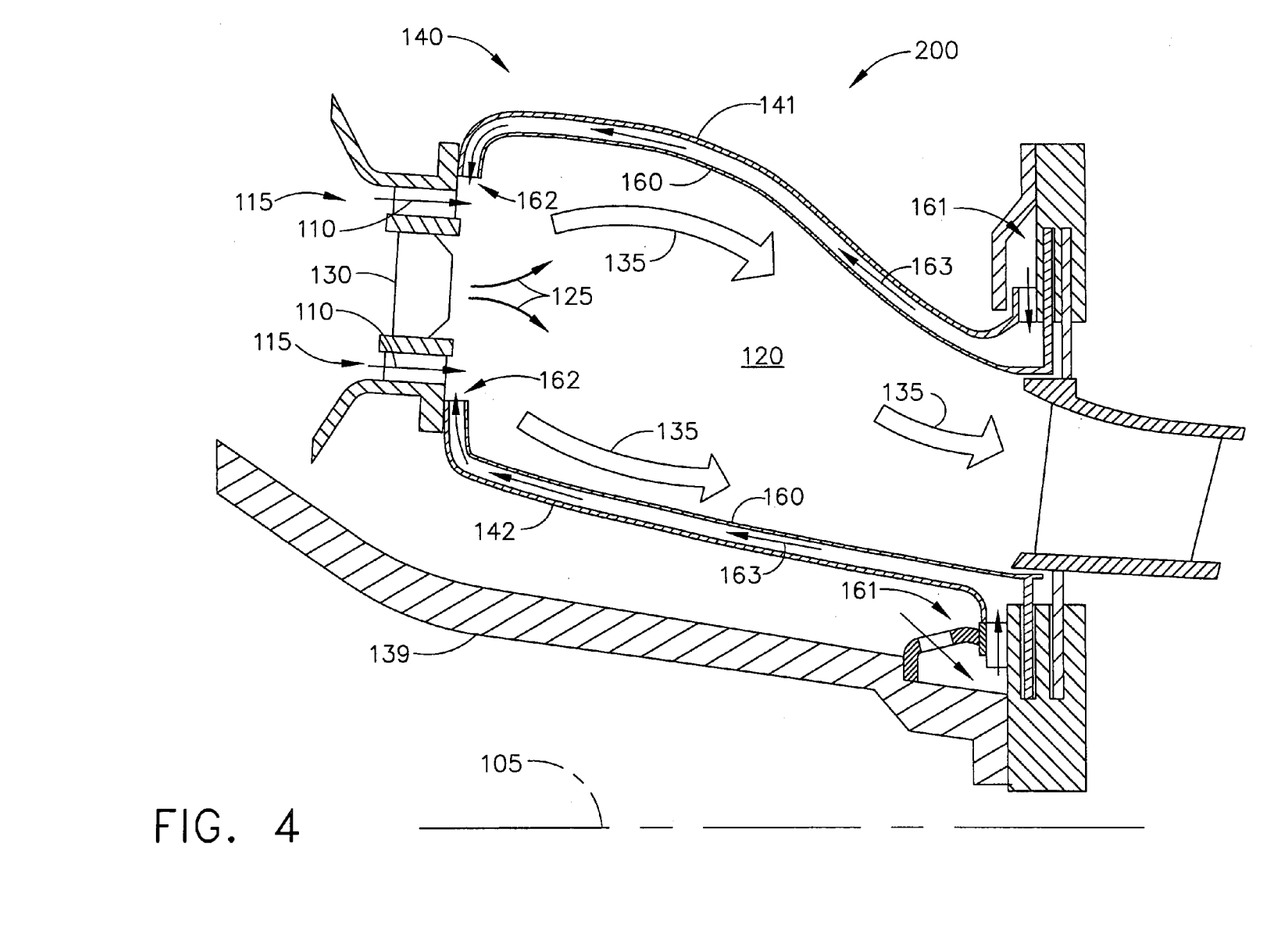
FIG. 4 shows a cross sectional view of a combustor for a gas turbine engine with cooling tubes configured on the interior side of the shell, according to an embodiment of the invention.

FIG. 4 shows another embodiment of a combustor 200 where the cooling tubes 160 are positioned on the interior sides of the outer liner 141 and the inner liner 142. In this embodiment, the cooling tubes 160 are said to be positioned on the "hot side" of the combustor chamber 120. All other aspects of the embodiment shown in FIG. 4 can be as described in FIG. 3.

Figure 5:
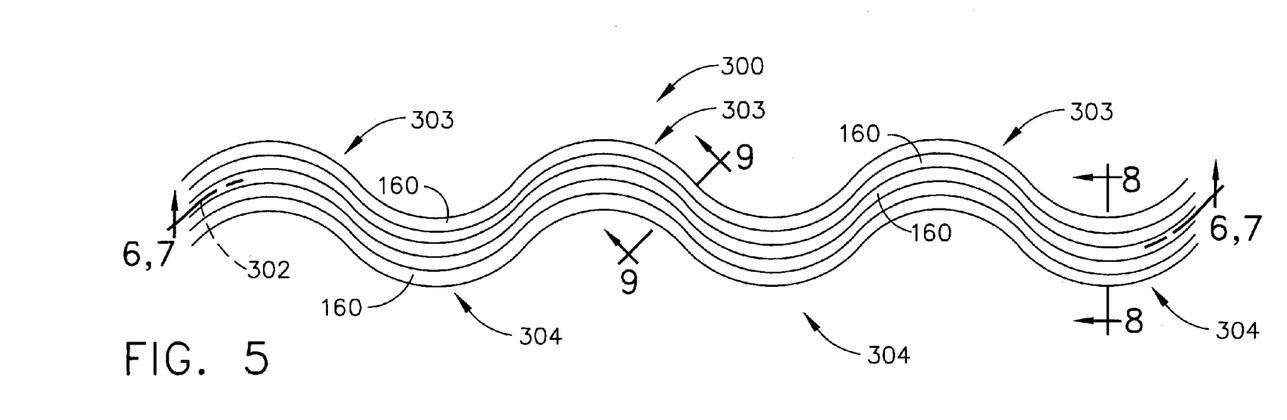
FIG. 5 shows a representative portion of the cooling tube assembly that has been projected onto a plane for illustrative purposes, according to an embodiment of the invention.

Referring now to FIG. 5, a plurality of cooling tubes forming a portion 300 of a cooling tube assembly is shown. The portion 300 as shown may apply to either embodiment 100 or embodiment 200, i.e. for cooling the combustor on either the cool side or the hot side, respectively. The portion 300 of the cooling tube assembly shown is projected onto a plane for illustrative purposes so that a curvature of the liner 140 is removed, thus illustrating an exemplary serpentine shape of the cooling tubes that remains in contrast to the prior art. Each cooling tube 160 may be formed as a plurality of alternate bends, generally resembling a sinusoidal configuration in this embodiment. However, the present invention envisions other configurations such as waves or bends of varying curvature. Referring again to FIG. 5, each cooling tube 160 may nest with an adjacent cooling tube without necessarily contacting it. This may be done so that if there is non-uniform expansion or contraction of adjacent tubes, the change in one tube may not cause undue strain or stress on an adjacent tube. However, there may be cases in which adjacent tubes may be allowed to maintain contact, for example to maintain a barrier between the interior chamber 120 and the liner 140. It is therefore also within the scope of the present invention to maintain contact between adjacent cooling tubes.

Figure 8:
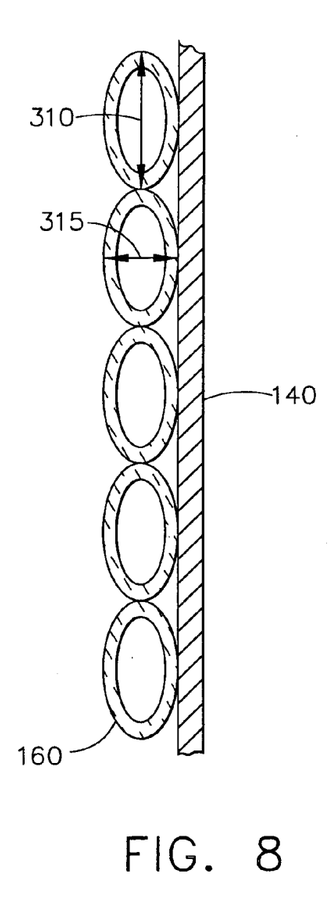
FIG. 8 shows a cross section of the cooling tube assembly portion shown in FIG. 5 at an area of greatest curvature of the cooling tubes, according to an embodiment of the invention.
Figure 9:
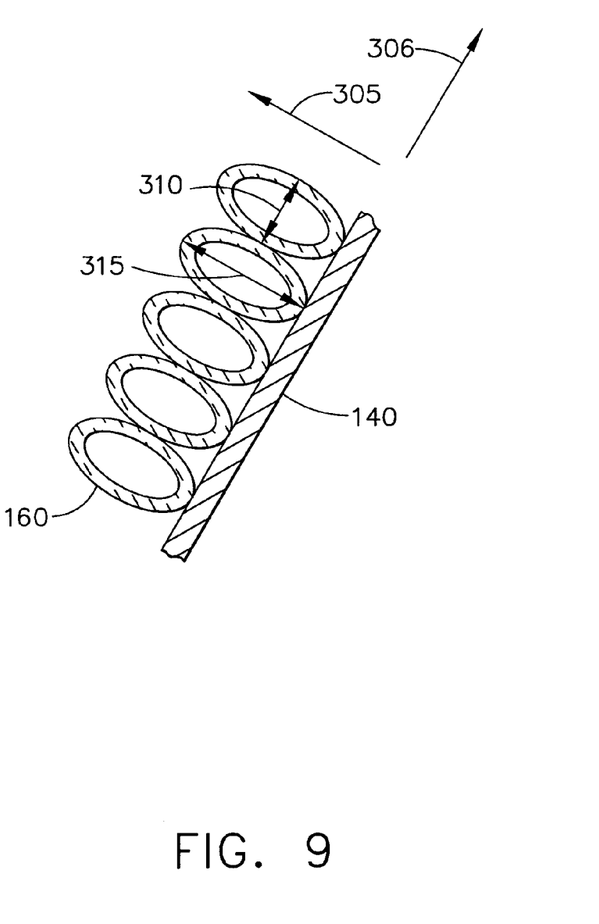
FIG. 9 shows a cross section of the cooling tube assembly portion shown in FIG. 5 at an area of least curvature of the cooling tubes, according to an embodiment of the invention.

The cross sectional shape of each cooling tube 160 may be initially circular; however, in order for the tubes to properly nest together the cross section of the tube 160 must be modified to allow for the bends and waves. The portion 300 of the cooling tube assembly in FIG. 5 shows a series of concave curves 303 alternating with a series of convex curves 304. FIG. 8 is a cross sectional view of the portion 300 taken generally along a concave curve 303 or a convex curve 304, and FIG. 9 is a cross sectional view of the portion 300 taken generally at a point where the curvature changes, i.e. where a concave curve 303 becomes a convex curve 304. As illustrated in FIG. 9 for purposes of explanation, a normal direction 305 is shown that is generally perpendicular to the surface of the liner 140 and a parallel direction 306 is shown that is generally parallel to the surface of the liner 140. The cross-sectional shape of cooling tubes 160 at these points where a concave curve 303 becomes a convex curve 304 may be configured so that the tube diameter 310 taken in the parallel direction 306 is less than the tube diameter 315 taken in the normal direction 305. In contrast, the cross-sectional shape of cooling tubes 160 shown in FIG. 8 and taken along either a concave curve 303 or a convex curve 304 may be configured so that a tube diameter 310 taken in the parallel direction 306 is greater than a tube diameter 315 taken in the normal direction 305. Thus, it has been found that varying the cooling tube diameters 310, 315, and thus their cross sectional shapes as they alternately transition between convex curves 304 and concave curves 303 may enable the cooling tubes 160 to nest more closely than otherwise.

Cooling tubes 160 configured with bends in the manner described herein may more easily accommodate thermal differences between themselves and the walls to which they are attached than cooling tubes having a linear configuration as heretofor described in the prior art. The bends may act like a bellows to absorb the thermal expansion difference.

Cooling tubes 160 configured on the hot side of the liner 140 are heated by both conduction from the tubes' function of cooling the liner 140 and convection from the hot gas stream 135, whereas cooling tubes 160 configured on the cool side of the liner 140 are heated by conduction only. When cooling tubes 160 are located on the cool side of liner 140, they will necessarily be cooler than the liner 140, since the side of the cooling tube 161 away from the liner 140 is exposed to a much cooler environment. If the heat loading on the liner 140 is sufficiently high, then particularly high stresses exceeding the fatigue limit of the cooling tube material may result. These stresses may be relieved by creating the cooling tubes 160 with bends as described heretofore to allow the cooling tube 160 to behave much like an accordion and expand and contract with the hot liner 140. The size of the cooling tubes 160, the radii of the bends made therein, and the number of bends may all be chosen according to the configuration of the combustor, the severity of the heat loading, and the amount and temperature of the pressurized air stream 110 that is available for cooling.

If the heat loading of the combustor is excessive for the amount of available cooling air, which may result in excessive thermal gradients in the tube that cannot be resolved with bends of a practical radii, then additional stress relief may be provided with dents and bulges that interrupt the stresses on the cold side of the tubes. In addition, it is well known in the art that a fluid flowing through an enclosed channel tends to smoothly conform to the walls of the channel according to a phenomenon known as laminar flow. The portion of the fluid flowing through the channel that is adjacent to the walls of the channel tends to stay adjacent to the walls by laminar flow. In the case of a prior art cooling tube, laminar flow keeps the same air flowing adjacent to the tube walls where it tends to absorb the most heat, leaving the interior of the flow relatively cool. It has been found that disrupting laminar flow by various means causes turbulence and vortices within the fluid flow, thus mixing the fluid and ensuring that more of the fluid contacts the walls of the channel to absorb heat. Thus, dents and bulges may be considered even in situations where the stress relief is not required.

Within the cooling tube provided by the invention, it has been found that, as the air within the cooling tube absorbs heat from the combustor liner, the portion of the cooling air adjacent to the inner wall of the cooling tube initially absorbs the heat and becomes less dense while the air near the center of the tube becomes relatively cooler and more dense. As the cooling air flows from one end of the cooling tube to the other and traverses the bends of the cooling tube, the cooling air has been found to centrifuge to the outer side of each bend, which tends to disrupt laminar flow of the cooling air and promotes better mixing and thus enhanced cooling.

Figure 6:
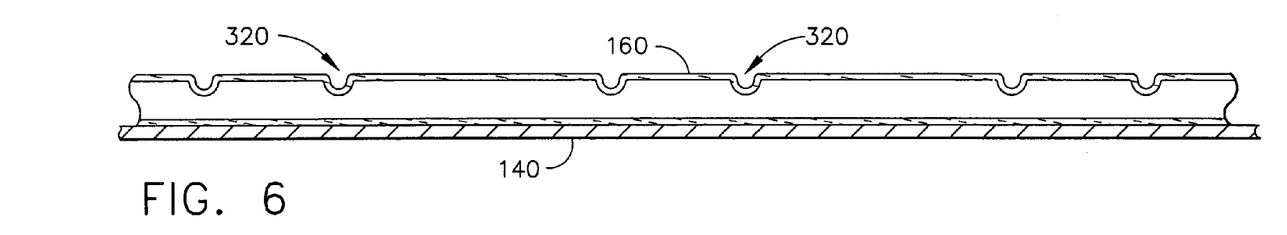
FIG. 6 shows a projection of the centerline of a single cooling tube upon a plane orthogonal to the plane in FIG. 5 to illustrate a representative method of providing additional thermal stress relief of the cooling tube, according to an embodiment of the invention.
Figure 7:
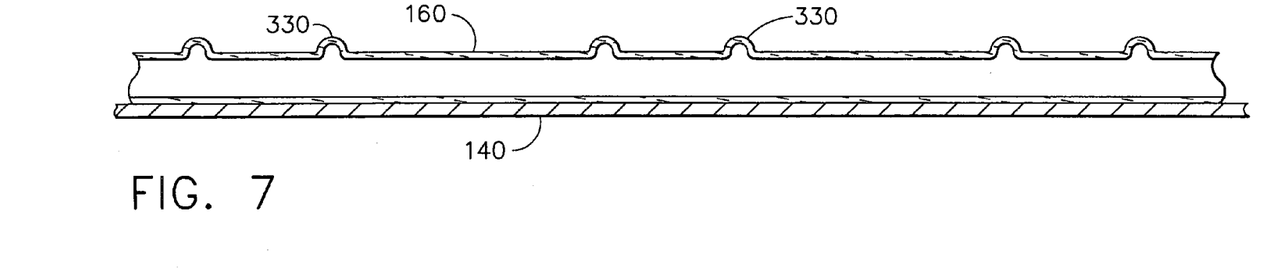
FIG. 7 shows a projection of the centerline of a single cooling tube upon a plane orthogonal to the plane in FIG. 5 to illustrate another representative method of providing additional thermal stress relief of the cooling tube, according to an embodiment of the invention.

FIG. 6 and FIG. 7 each show a projection of a cooling tube 160 taken along its serpentine centerline 302, the projection being taken in a direction that is orthogonal to the projection plane of FIG. 5 to remove the serpentine curvature of the cooling tube 160. FIG. 6 shows a series of dents 320, one or more of which may be impressed into the cooling tube 160 for providing additional stress relief and, secondarily, for enhancing the heat transfer inside the tube by disruption of the laminar flow along the inner walls of cooling tube 160. However, the dents 320 may unacceptably restrict the flow of cooling air within the cooling tube 160 by decreasing the cross sectional area of the cooling tube 160. If this is the case, then one or more bulges 330 shown in FIG. 7 may be impressed on the cooling tube 160 rather than and/or in addition to one or more dents 320.

The quantity and curvature of the bends in the cooling tube 160 may be dependent on the thermal loading and the allowable stress for the material selected for fabricating the cooling tube 160. A finite element analysis may be necessary to accurately determine the acceptable quantity and depths of the waves. For typical combustor thermal loading and materials, a reasonable initial selection may be four bends of any curvature that will adequately nest the tubes. If the stresses exceed the allowable design limits, then the quantity and curvature of the bends may be changed until acceptable stresses are achieved.

The serpentine or other similarly configured cooling tubes and cooling tube assembly may be fabricated of a metallic, heat-resisitant material, where the cooling tubes may be die formed to the desired shape and brazed to the combustor liner by conventional means to conform to the contour of the combustor liner. A braze alloy may be applied either to the sides of the cooling tubes that mate with the liner, to the surface of the liner, or along the edge of the tubes as they are assembled onto the wall. The sides of the shaped cooling tubes may be coated with a braze stop-off to prevent the cooling tubes from being brazed to one another. The cooling tubes may then be assembled on the liner surface and held in place with straps, dies, mandrels, or similar tooling. The assembly may then be inserted into a vacuum furnace to braze the cooling tube assembly to the combustor liner.

Figure 10:
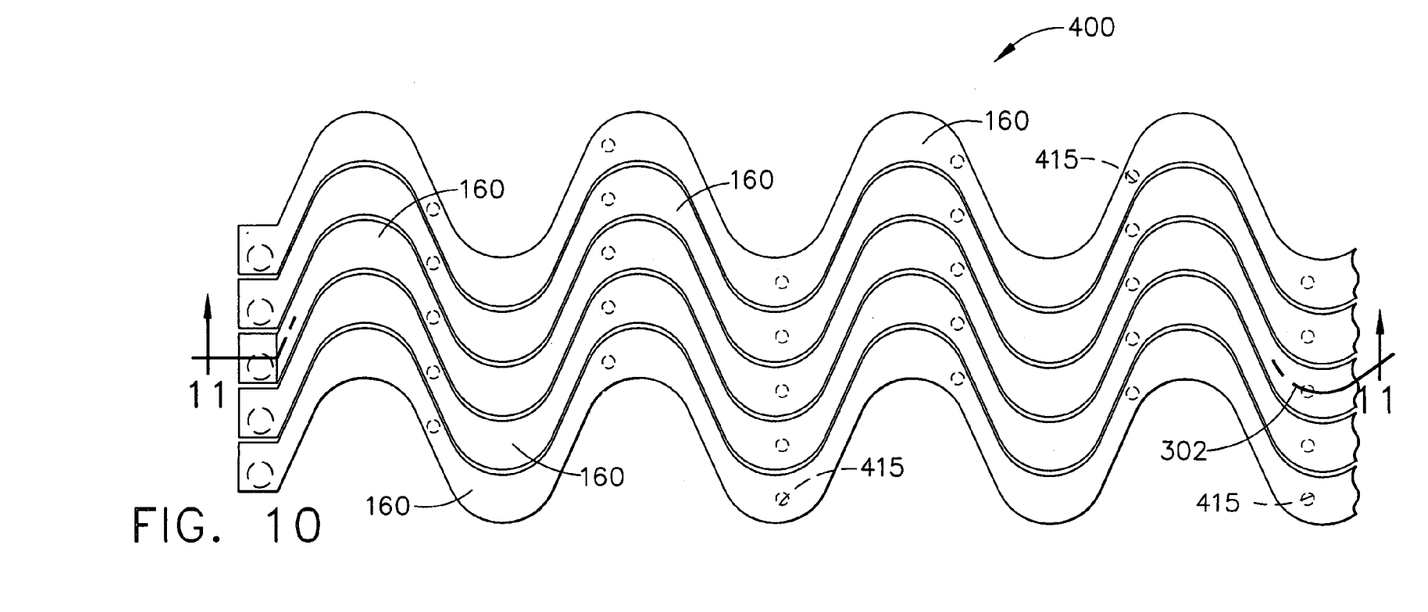
FIG. 10 shows a portion of the cooling tube assembly that has been projected onto a plane for illustrative purposes, showing a means for attaching the cooling tubes to the liner when the cooling tubes are composed of a metallic material, according to an embodiment of the invention.
Figure 11:
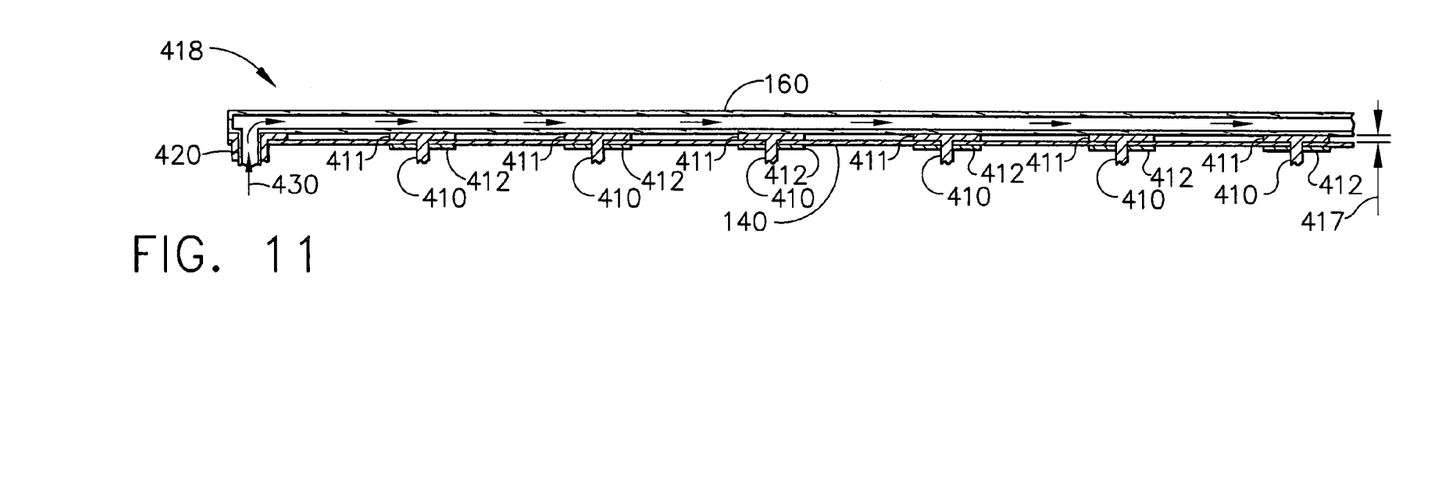
FIG. 11 shows a projection of the centerline of a single cooling tube upon a plane orthogonal to the plane in FIG. 10 to further show the method of attaching metallic cooling tubes to the liner, according to an embodiment of the invention.

Referring to FIG. 10 and FIG. 11, an alternative attachment means is shown for a cooling tube assembly 400. According to this embodiment, a plurality of pins 410, each pin having a head 411, is shown for each cooling tube 160. The heads 411 may be brazed along the extent of the cooling tube 160 on the side the cooling tube 160 that is immediately adjacent to the surface of the liner 140. The pins 410 may extend in a direction perpendicular to the surface of the cooling tube 160 and may be inserted into corresponding holes 415 in the liner 140 so that the heads 411 may maintain the cooling tube 160 a spaced distance 417 from the liner 140; alternatively, the heads 411 may be sufficiently thin so as to allow the cooling tube 160 to contact the liner 140. Washers 412 may be installed and affixed to the pin 410 as by standard means known to the art, such as by welding. If the liner 140 has significant contour variations, then the assembly of pins 410 into the holes 415 in the liner 140 may require excessive clearance.

Figure 12:
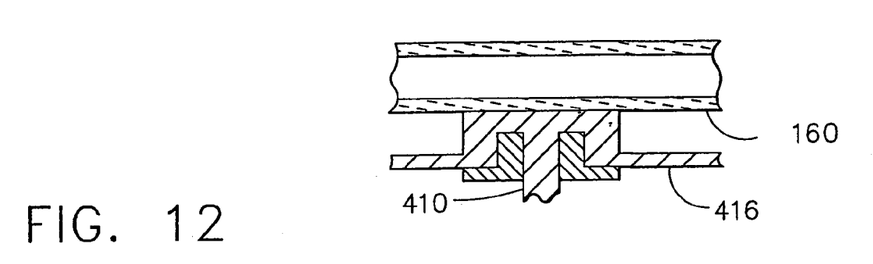
FIG. 12 shows a side cross sectional view of a shouldered washer, illustrating the use of the shouldered washer to allow a cooling tube to be spaced from the liner under circumstances where the contour of the liner requires large holes for assembly.

FIG. 12 shows the use of a shouldered washer 416 to allow additional clearance for inserting pins 410 through the holes 415 in the liner 140 when the hole 415 has a larger diameter than the pin 410. The shouldered washer 416 may then occupy the space of the additional clearance between the pin 410 and the larger hole 415. An entrance pin 420 may be used at an end 418 of the cooling tube 160 into which cooling air 430 flows. The entrance pin 420 may be larger and hollow to allow the entrance of the cooling air 430.

The embodiment shown in FIGS. 10, 11, and 12 may be advantageously used to provide an attachment means that is less rigid than brazing the cooling tubes to the liner as described earlier. This embodiment can allow the cooling tubes to expand and contract more freely in response to heat stresses. This is particularly true when the cooling tube assembly 400 is to be attached to the hot side of a combustor liner. In this situation, the cooling tube assembly can serve as a liner to the combustor wall. The cooling tubes 160 may be attached to the liner with pins 410 at holes 415 rather than rigidly bonded. The expansion difference between the cooling tube 160 and liner 140 is accommodated by differential bending of each cooling tube 160 along its length between its endpoints. The optimum configuration of the cooling tubes may feature more numerous curves with sharper angles of curvature than if the cooling tubes are rigidly attached to the liner. There may also be a slight rotation about at the pins 410 as the cooling tube 160 expands and contracts. The pins 410 may be free to rotate in the holes 415 located in the combustor liner and are held in place by being welded to a washer 412 on the cool side.

The cooling tubes and cooling tube assembly may also be fabricated from ceramic matrix composite (CMC) material, where the cooling tube internal shape may be formed by using an expendable material that is die formed to the desired shape. The invention provides an innovative process in which a set of mandrels made of an expendable material may be formed for each cooling tube to be fabricated according to the contour of a selected combustor liner. The expendable material can have properties that allow it to be later removed by standard means known to the art, such as by a chemical solvent, oxidation, or vaporization; for example, graphite may be used as an expendable material. CMC fabric may be either woven or wrapped around the expendable mandrels. One way of applying the CMC fabric to the expendable mandrels is to fabricate the CMC material into a hollow woven rope or tube-like structure that expands to allow insertion of the expendable mandrel therein, so that a section of hollow rope surrounds each expendable mandrel. Several such layers of CMC fabric may be used to build up a desired thickness of the cooling tube wall. Internal heat transfer enhancement, as described heretofore in the form of dents and bulges, may be formed as the hollow rope is applied to the expendable mandrel. Reasonable dents and bulges may be formed in the mandrel, providing that the fabric will contour to the surface. If necessary, single strands of fiber may be wrapped around the circumference of the tube to aid the fabric in contouring to the mandrel shape. If dents and bulges are needed only for thermal enhancement, an alternative may be to form a dent by making a groove in the circumference of the expandable mandrel and then filling the groove with a toe of fabric prior to covering the fabric of the hollow rope.

The individual fabric covered tube mandrels may be assembled onto a holding tool in the shape of the combustor liner to which the cooling tubes are to be applied, and the outer surface of the assembled cooling tubes may be covered with CMC fabric material. A thin layer of the expendable material may be applied between adjacent cooling tubes to prevent bonding during the matrix filling process, if it is desirable for strain relief reasons to prevent adjacent cooling tubes from being bonded to each other. If the cooling tubes are to be installed on the outside of the assembly, then the CMC fabric may be woven, braided, or laid on the die first, followed by the assembling of the cooling tubes thereon. The assembly of cooling tubes and backing material may then be placed in the furnace for densification according to standard processes known to the art, in order to fill the voids within the fabric. The expendable material may then be removed by chemical, oxidative, or vaporization means and any further finishing steps completed. Alternatively, the expendable material may be removed after partial densification and then later densified after other processing steps are completed as required by the particular process. The surface of the cooling tubes or liner wall, which ever is exposed to the combustor hot gasses, may be covered with an insulation material if desired.

An inventive apparatus and method has thus been disclosed for cooling a combustor liner in a gas turbine engine. The apparatus includes a plurality of cooling tubes for installation either on the hot side or the cool side of the combustor liner, each cooling tube having an serpentine shape along the combustor liner that allows the cooling tube to expand and contract in response to extreme heat gradients commonly found in the combustor environment. The cooling tube assembly may be fabricated out of either heat resistant metal materials or CMC materials. For metallic materials, the cooling tube assembly may be attached to the liner by brazing it thereto or by mounting it to an assembly of pins that are allowed to rotate within mounting holes in the liner wall as each cooling tube thermally responds to heat stress. For CMC materials, an innovative method of fabricating the cooling tubes is disclosed in which the CMC material may be made in the form of an expandable woven tube into which an expandable mandrel is inserted having the unique cooling shape to form the internal cavity of the cooling tube.

It should be understood, of course, that the foregoing relates to preferred embodiments of the invention and that modifications may be made without departing from the spirit and scope of the invention as set forth in the following claims.

I claim:

1. A cooling tube for cooling a liner of a combustor chamber of a gas turbine engine, comprising:
   a single chamber cooling tube having a first end in fluid communication with a plenum and located proximate a rear end of the combustor chamber, the plenum supplying air to the combustor chamber;
   the single chamber cooling tube further having a second end in fluid communication with an area in proximity with a gas injector of the gas turbine engine and located proximate a front end of the combustor chamber; and
   a centerline extending from the first end to the second end, wherein the centerline, the first end, and the second end are non-linear when projected onto a plane;
   wherein the rear end of the combustor chamber and the front end of the combustor chamber are located at opposed ends of the combustor chamber for uni-directional flow of a fluid through the single chamber cooling tube, wherein the cooling tube has a serpentine shape conforming to a contour of the liner and the serpentine shape of the cooling tube allows the cooling tube to expand and contract in response to temperature gradients in the combustor chamber.

2. The serpentine cooling tube described in claim 1, wherein the cooling tube is positioned outside the combustor chamber along an exterior side of the liner.

3. A single chamber cooling tube for cooling a liner of a combustor chamber of a gas turbine engine, the single chamber cooling tube comprising:
   a first end of the single chamber cooling tube in fluid communication with a plenum supplying air to the combustor chamber, the first end located proximate a rear end of the combustor chamber;
   a second end of the single chamber cooling tube in fluid communication with an area in proximity with a gas injector of the gas turbine engine, the second end located proximate a front end of the combustor chamber, the sing chamber cooling tube positioned within the combustor chamber along an interior side of the liner,
   wherein the exhaust end of the combustor chamber and the intake end of the combustor chamber are located at opposed ends of the combustor chamber for uni-directional flow of a fluid through the single chamber serpentine cooling tube; and
   wherein the single chamber cooling tube has a serpentine shape conforming to a contour of the line and the serpentine shape of the cooling tube allows the single chamber cooling tube to expand and contract in response to temperature gradients in the combustor chamber.

4. A cooling tube assembly for cooling a liner of a combustor chamber of a gas turbine engine, the assembly comprising
   a plurality of single chamber serpentine cooling tubes attached to the liner, each single chamber serpentine cooling tube conforming to a contour of the liner, each single chamber serpentine cooling tube including:
a first end in fluid communication with a plenum supplying air to an exhaust end of the combustor chamber, the first end located proximate the exhaust end of the combustor chamber;
a second end in fluid communication with an area in proximity with a gas injector of the gas turbine engine, the second end located proximate an intake end of the combustor chamber, wherein the exhaust end of the combustor chamber and the intake end of the combustor chamber are located at opposed ends of the combustor chamber for uni-directional flow of a fluid through each of the plurality of single chamber serpentine cooling tubes; and
a centerline extending from the first end to the second end, wherein the centerline, the first end, and the second end are non-linear when projected onto a plane.

5. The cooling tube assembly described in claim 4, wherein the cooling tube assembly is in contact with the liner.

6. The cooling tube assembly described in claim 4, wherein the cooling tube assembly is maintained at a spaced distance from the liner.

7. The cooling tube assembly described in claim 4, wherein the plurality of single chamber serpentine cooling tubes is positioned on an exterior side of the liner.

8. The cooling tube assembly described in claim 4, wherein the serpentine shape of each tube is formed as a plurality of alternating convex and concave bends along a length of each tube.

9. A cooling tube assembly for cooling a liner of a combustor chamber of a gas turbine engine, the assembly comprising
a plurality of single chamber serpentine cooling tubes attached to the liner, each serpentine cooling tube conforming to a contour of the liner, each single chamber serpentine cooling tube having a first end in fluid communication with a plenum located proximate an exhaust end of the combustor chamber, each single chamber serpentine cooling tube having a second end in fluid communication with an area in proximity with a gas injector of the gas turbine engine located proximate an intake end of the combustor chamber, wherein the exhaust end of the combustor chamber and the intake end of the combustor chamber are located at opposed ends of the combustor chamber for uni-directional flow of a fluid through each of the plurality of single chamber serpentine cooling tubes, each single chamber serpentine cooling tube supported by a plurality of pins to maintain the serpentine cooling tube at a spaced distance from the liner and
each pin having a proximal end attached to the simile chamber serpentine cooling tube and a distal end inserted through a hole in the liner, the distal end being secured from removal from the hole in a manner allowing rotational movement of the pin within the hole.

10. The cooling tube assembly described in claim 9, wherein:
each single chamber serpentine cooling tube is fabricated of a metallic material; and
each proximal end is secured to the single chamber serpentine cooling tube by brazing.

11. The cooling tube assembly described in claim 9, wherein the plurality of single chamber serpentine cooling tubes is positioned on an interior side of the liner.

12. A method of cooling a combustor liner, comprising:
diverting a portion of an incoming pressurized gas stream entering an intake end of the combustor to a plenum located proximate an exhaust end of the combustor;
directing the pressurized gas stream from the plenum through a plurality of single chamber serpentine cooling tubes aligned along a surface of the combustor liner, each single chamber serpentine cooling tube having a first end in fluid communication with the plenum and located proximate and exhaust end of the combustor, a second end in fluid communication with an area proximate with a fuel atomizer and located proximate the intake end of the combustor, and a centerline extending from the first end to the second end, wherein the centerline, the first end, and the second end are non-linear when projected onto a plane and wherein the exhaust end of the combustor and the intake end of the combustor are located at opposed ends of the combustor liner for uni-directional flow of a fluid through each of the plurality of single chamber serpentine cooling tubes;
allowing the pressurized gas stream flowing through the single chamber serpentine cooling tubes to absorb heat from the combustor wall to heat the pressurized gas stream to form a heated gas stream; and
providing the heated gas stream exiting the second ends to the fuel atomizer, whereby the heated gas stream aids combustion.

13. The method of cooling a combustor liner described in claim 12, wherein the plurality of single chamber serpentine cooling tubes is aligned along an interior surface of the combustor liner.

14. The method of cooling a combustor liner described in claim 13,
wherein the plurality of single chamber serpentine cooling tubes is comprised of a metallic material, and
wherein each cooling tube is supported by a plurality of pins maintaining the cooling tube a spaced distance from the liner, each pin having a proximal end attached to the cooling tube and a distal end inserted through a hold in the liner, the distal end being secured from removal from the hole in a manner allowing rotational movement of the pin within the hole.

15. The method of cooling a combustor liner described in claim 12, wherein the plurality of single chamber serpentine cooling tubes is aligned along an exterior surface of the combustor liner.

16. A method of cooling a combustor liner, comprising:
diverting a portion of an incoming pressurized gas stream entering an intake end of the combustor to a plenum located proximate an exhaust end of the combustor;
directing the pressurized gas stream from the plenum through a plurality of single chamber serpentine cooling tubes aligned along a surface of the combustor liner, each single chamber serpentine cooling tube comprised of a ceramic matrix composite material and having a first end in fluid communication with the plenum and located proximate and exhaust end of the combustor, a second end in fluid communication with an area proximate with a fuel atomizer and located proximate the intake end of the combustor, and a centerline extending from the first end to the second end, wherein the centerline, the first end, and the second end are non-linear when projected onto a plane and wherein the exhaust end of the combustor and the intake end of the combustor are located at opposed ends of the combustor liner for uni-directional flow of a fluid through each of the plurality of single chamber serpentine cooling tubes;

allowing the pressurized gas stream flowing through the single chamber serpentine cooling tubes to absorb heat from the combustor wall to heat the pressurized gas stream to form a heated gas stream; and providing the heated was stream exiting the second ends to the fuel atomizer, whereby the heated gas stream aids combustion.

* * * * *

UNITED STATES PATENT AND TRADEMARK OFFICE
CERTIFICATE OF CORRECTION

PATENT NO. : 7,043,921 B2 Page 1 of 1
APPLICATION NO. : 10/648937
DATED : May 16, 2006
INVENTOR(S) : James L. Hadder It is certified that error appears in the above-identified patent and that said Letters Patent is hereby corrected as shown below:

Column 11, line 53, "simile" should be changed to --single--;
Column 14, line 3, "was" should be changed to --gas--.

Signed and Sealed this

Twentieth Day of March, 2007

JON W. DUDAS
*Director of the United States Patent and Trademark Office*